Patented Feb. 23, 1937

2,071,323

UNITED STATES PATENT OFFICE 2,071,323

ORGANIC PHOSPHATES AND METHOD OF MAKING SAME

Shailer L. Bass, Midland, Mich., assignor to The Dow Chemical Company, Midland, Mich., a corporation of Michigan No Drawing. Application January 19, 1935, Serial No. 2,585

10 Claims. (Cl. 260—99.20)

This invention concerns certain new compounds, viz. triaryl phosphates having the general formula

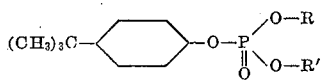

wherein R and R' each represent aromatic radicals, together with a method of making said compounds.

My new triaryl phosphates are substantially non-flammable and possess fungicidal properties which make them useful for impregnating wood, cotton, and other cellulose materials to reduce their flammability and render the same resistant to mold and other fungi. Many of these new compounds are permanent liquids at ordinary temperatures and are particularly useful as plasticizers in preparing nitrocellulose products and the like, since they are unusually resistant to discoloration by light.

The new phosphates, having the above general formula, are prepared by reacting a phosphorus oxyhalide with para-tertiary-butylphenol and, if required, other phenols, e. g. phenol, cresol, naphthol, cyclohexylphenol, etc., or alkali metal salts thereof. When tri-tertiarybutylphenyl phosphate is the product desired, a phosphorus oxyhalide is reacted directly with approximately three molecular equivalents of tertiarybutylphenol or an alkali metal salt thereof. When a mixed triaryl phosphate, e. g. phenyl-cresyl-tertiarybutylphenyl phosphate or dinaphthyl-tertiarybutylphenyl phosphate, is desired, a phosphorus oxyhalide is reacted successively with tertiarybutylphenol or an alkali metal salt thereof and the other necessary phenolic compounds, e. g. naphthol or sodium naphtholate. The order in which the different phenolic compounds are reacted is generally of little importance.

I prefer to employ a free phenol, rather than an alkali metal salt thereof, as a reactant in preparing a triaryl phosphate of the present class. The free phenols react as smoothly and readily as do their alkali metal salts and they can usually be obtained more readily and at lower cost than can such salt. Furthermore, the hydrogen halide which is evolved when a free phenol is employed as a reactant may be collected as a valuable by-product.

To prepare a mixed phosphate of the present type, a phosphorus oxyhalide may first be reacted with sufficient tertiarybutylphenol to form a tertiarybutylphenyl phosphoric acid dihalide or a di-tertiarybutylphenol phosphoric acid monohalide, as desired, and the resultant acid halide may thereafter be reacted with another phenol, e. g. phenol, cresol, naphthol, etc., to form the mixed triaryl phosphate product. If desired, the order in which the different phenols are reacted may be changed, e. g. the phosphorus oxyhalide may first be reacted with a phenol other than tertiarybutylphenol, e. g. phenol, naphthol, etc. to form the corresponding aryl phosphoric acid mono- or di-halide and the latter may thereafter be reacted with tertiarybutylphenol to form the triaryl phosphate product. Also, the triaryl phosphate may be prepared by reacting tertiarybutylphenol with any monoaryl phosphoric acid dihalide, e. g. cresyl phosphoric acid dichloride, phenyl phosphoric acid dibromide, etc., or with any diaryl phosphoric acid monohalide, e. g., dinaphthyl phosphoric acid monochloride, etc.

Each of the reactions mentioned above is carried out by heating a mixture of the reactants to a reaction temperature, preferably in the presence of a catalyst such as metallic calcium, magnesium, or aluminum, or a chloride of magnesium, aluminum, or iron, etc. The temperature to which the mixture must be heated in order to obtain rapid and substantially complete reaction is, of course, dependent upon the particular reactants employed, the relative proportions of the reactants, the presence or absence of a catalyst, etc. Since, however, the reaction is accompanied by an evolution of hydrogen halide, it is necessary merely to heat the mixture to a temperature at which hydrogen halide gas is evolved. The reactions are preferably carried out at the lowest convenient reaction temperature, usually below 200° C., since at higher temperatures by-product formation may occur to an objectionable extent.

In preparing a mixed organic phosphate of the present class from a phosphorus oxyhalide and the necessary phenolic compounds, the intermediate phosphoric acid halide product may be separated, e. g. by fractional distillation, prior to carrying out the successive reactions. However, I find it convenient after formation of such intermediate acid halide merely to add the desired quantity of a second phenol, e. g. phenol, naphthol, etc. and to continue the reaction to form the triaryl phosphate. By operating in such manner the extra steps involved in separating the intermediate acid halide are avoided. After the reactions for the formation of the triaryl phosphate are completed, the reaction mixture is preferably treated to remove hydrogen halide therefrom. Such treatment may consist in blowing the hot reaction mixture with air and/or in dissolving the mixture in a solvent, e. g. benzene, ortho-dichlorobenzene, toluene, etc., and washing the resultant solution successively with an aqueous mineral acid, an aqueous alkali solution, and water. The triaryl phosphate product may then be isolated by usual procedure, e. g. by fractional distillation or, if the product is a solid at room temperature, by fractional crystallization from alcohol, benzene, toluene, xylene or other suitable solvent.

The following equations for the successive formation of (1) tertiarybutylphenyl phosphoric acid dichloride, (2) phenyl-tertiarybutylphenyl phosphoric acid monochloride, and (3) phenyl-(beta-naphthyl)-tertiarybutylphenyl phosphate illustrate the type of reactions involved in operating according to the procedure described above:—

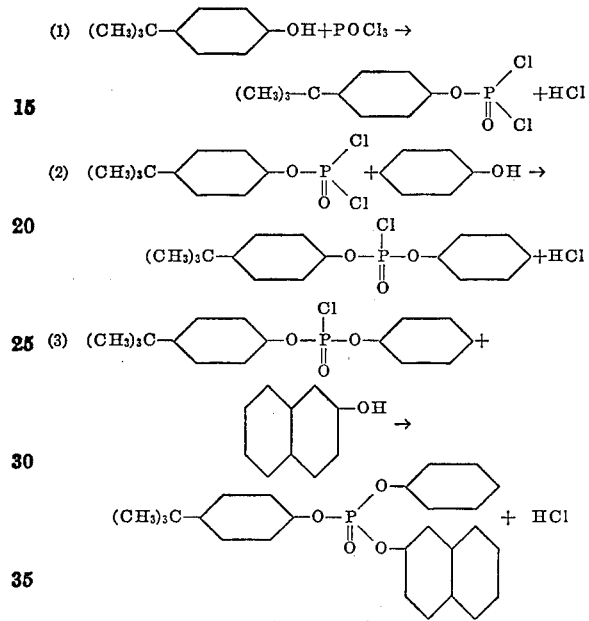

EXAMPLE 1
*Tri-(para-tertiarybutylphenyl) phosphate*

A mixture of 616 grams (4 mols) of phosphorus oxychloride, 1801.5 grams (12 mols) of para-tertiarybutylphenol, and 19 grams of magnesium chloride was heated for 9 hours at temperatures which were gradually raised from 88° to 175° C. The reaction mixture was then dissolved in 3 kilograms of ortho-dichlorobenzene and the solution was washed successively with a dilute hydrochloric acid solution, a dilute sodium hydroxide solution, and water. The phosphate solution was dried over calcium chloride and then fractionally distilled under vacuum. There was collected 1700 grams of a fraction, distilling at 315°–317° C. at 4 millimeters pressure, which solidified on cooling. This material was of light brown color. It was dissolved in alcohol and the solution was heated with 100 grams of bleaching earth and then filtered while hot. From the filtrate there was crystallized 1555 grams of a material which was found by analysis to be substantially pure tri-(para-tertiarybutylphenyl) phosphate. The product was obtained in the form of white prismatic needles melting at 101° C. It has the formula:

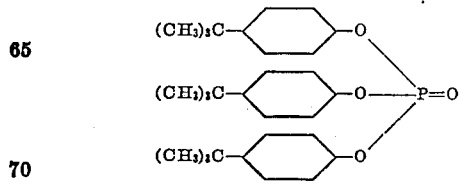

EXAMPLE 2
*Beta-naphthyl - di - (para-tertiarybutylphenyl) phosphate*

(a) A mixture of 1501 grams (10 mols) of para-tertiarybutylphenol, 2301 grams (15 mols) of phosphorus oxychloride, and 15 grams of anhydrous magnesium chloride was heated at temperatures varying from 75° to 120° C. for 2.5 hours, i. e. until the evolution of hydrogen chloride from the mixture had substantially ceased. The hot reaction mixture was blown with air to remove hydrogen chloride therefrom and then fractionally distilled under vacuum. There was collected 1706 grams of a liquid fraction which distilled over at 176° C. at 10 millimeters pressure. This material boiled at 150°–153° C. at 6 millimeters pressure and had the specific gravity 1.244 at 20° C. It was substantially pure para-tertiarybutylphenyl phosphoric acid dichloride. During said distillation there was also separated 191 grams of another fraction of material, distilling between 190° and 310° C. at 10 millimeters pressure, which solidified on cooling. Said material was recrystallized from petroleum ether, whereby 27.5 grams of substantially pure di-(para-tertiarybutylphenyl) phosphoric acid monochloride was separated in the form of colorless crystals melting at 100.5°–101.5° C.

(b) A mixture of 133.5 grams (0.5 mol.) of the para-tertiarybutylphenyl phosphoric acid dichloride, 75 grams (0.5 mol.) of para-tertiarybutylphenol, and 6 grams of anhydrous magnesium chloride was heated for 1.5 hours at temperatures which were gradually raised from 120° to 150° C. 72 grams of beta-naphthol was then added and the mixture was heated at 135°–140° C. for an additional hour. The reacted mixture was dissolved in 274 grams of ortho-dichlorobenzene and the solution was washed successively with dilute hydrochloric acid, a dilute sodium hydroxide solution, and water. It was then dried over calcium chloride, after which the ortho-dichlorobenzene was removed by distillation. The residual material was treated with 40 grams of a bleaching earth and the resultant mixture was heated under vacuum at 250° C. for 30 minutes and then filtered while hot. There was obtained 140 grams of filtrate in the form of a brown viscous liquid which solidified on standing. The material was recrystallized from methyl alcohol whereby it was obtained in the form of a fine crystalline powder of light-yellow color. The product was analyzed and found to be substantially pure beta-naphthyl-di-(para-tertiarybutylphenyl) phosphate. It has the formula:

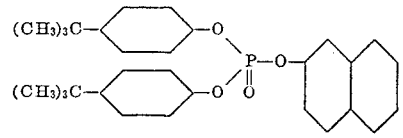

EXAMPLE 3
*Phenyl-(ortho-cyclohexylphenyl)-(para-tertiarybutylphenyl) phosphate*

A mixture of 81.2 grams (0.24 mol.) of phenyl-(para-tertiarybutylphenyl) phosphoric acid monochloride, 44 grams (0.25 mol.) of ortho-cyclohexylphenol, and 1.2 grams of anhydrous magnesium chloride was heated to 150° C. for 2 hours. The reaction mixture was then dissolved in 120 grams of ortho-dichlorobenzene. The resultant solution was washed successively with dilute hydrochloric acid, a dilute sodium hydroxide solution, and water, after which it was dried over calcium chloride. It was then fractionally distilled under vacuum, whereby 62 grams of material distilling at 293°–300° C. at 6.4 millimeters pressure was separated. This material was analyzed and found to be substantially pure phenyl-(ortho-cyclohexylphenyl)-(para-tertiarybutylphenyl) phosphate. It is a water-white viscous liquid having the specific gravity 1.117 at 40° C. with respect to water at 4° C. It has the formula:

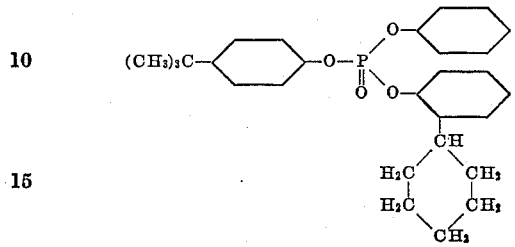

Example 4

*Di-phenyl-(para-tertiarybutylphenyl) phosphate*

A mixture of 214.9 grams (0.8 mol.) of diphenyl phosphoric acid monochloride, 120.1 grams (0.8 mol.) of para-tertiarybutylphenol, and 7 grams of magnesium chloride was heated at temperatures between 125° and 150° C. for 2 hours. The product was then separated and purified by procedure similar to that described in Example 3. There was obtained 240 grams of substantially pure di-phenyl-(para-tertiarybutylphenyl) phosphate. The product is a viscous, nearly colorless liquid boiling at approximately 261° C. at 6 millimeters pressure and having the specific gravity 1.157 at 25° C. with respect to water at 4° C. It has the formula;

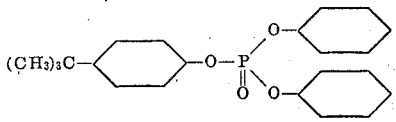

Example 5

*Phenyl-di-(para-tertiarybutylphenyl) phosphate*

A mixture of 422 grams (2 mols) of phenylphosphoric acid dichloride, 300 grams (2 mols) of para-tertiarybutylphenol, and 13 grams of magnesium chloride was heated at 100°–125° C. for 2 hours. An additional 300 grams of para-tertiarybutylphenol was then added and heating was continued at 125°–170° C. for 2 hours. The hot mixture was then blown with air, after which the product was separated and purified as in Example 3. There was obtained 652 grams of substantially pure phenyl-di-(para-tertiarybutylphenyl) phosphate. Said compound distilled at 281° C. at approximately 5.5 millimeters pressure and had the specific gravity 1.108 at 25° C. with respect to water at 4° C. It has the formula;

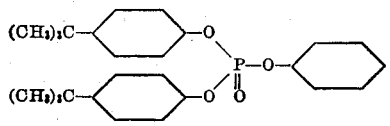

Example 6

*Para-tertiarybutylphenyl-di-(ortho-cresyl) phosphate*

A mixture of 216 grams (2 mols) of orthocresol and 9.5 grams of anhydrous magnesium chloride was heated to about 105° C. While maintaining the mixture at said temperature, 267 grams (1 mol.) of para-tertiarybutylphenyl phosphoric acid dichloride was gradually added thereto in a period of 1.5 hours. The temperature was then slowly raised to 180° C., the rate of temperature rise being about 15° per hour. After the evolution of hydrogen chloride had ceased, the mixture was blown with air for two hours, while being maintained at about 130° C. 500 cubic centimeters of ortho-dichlorobenzene was then added and the resultant solution was washed successively with a dilute hydrochloric acid solution, a dilute sodium hydroxide solution, and water. It was then fractionally distilled under vacuum. There was collected 359 grams of material distilling at 284° C. at 20 millimeters pressure, which material was found to be substantially pure para-tertiarybutylphenyl-di-(ortho-cresyl) phosphate. The product is an odorless and tasteless, water-white viscous liquid having the specific gravity 1.137 at 25° C. with respect to water at the same temperature. It has the formula:

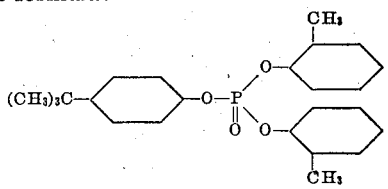

Other triaryl phosphates of the present class which were prepared by procedure similar to that set forth in the above examples are described in the following table:

| Compound | Melting point, ° C. | Boiling point | | Specific gravity |
|---|---|---|---|---|
| | | ° C. | Pressure, mm. | |
| (CH₃)₃C—⟨⟩—O—P(=O)(O—⟨⟩—Cl)(O—⟨⟩—Cl) | Liquid at room temperature. | 287 | 4 | 1.262 at 20° C. |
| (CH₃)₃C—⟨⟩—O—P(=O)(O—⟨⟩—OCH₃)(O—⟨⟩—OCH₃) | Liquid at room temperature. | 295 | 4 | 1.198 at 20° C. |
| (CH₃)₃C—⟨⟩—O—P(=O)(O—⟨⟩—C₆H₁₁)(O—⟨⟩—C₆H₁₁) | 81.5 | | | |

*C₆H₁₁ represents the cyclohexyl radical.

Instead of employing phosphorus oxychloride as a reactant in preparing the aforesaid new compounds, I may use phosphorus oxybromide or phosphorus oxyiodide. The general procedure followed in carrying out the reaction is the same regardless of the particular phosphorus oxyhalide used. Also, instead of anhydrous magnesium chloride, other anhydrous catalysts, e. g. aluminum chloride, ferric chloride, or the metals calcium, magnesium or aluminum, etc. can be used.

The phenolic reactants employed in preparing a triaryl phosphate of the present class may contain substituents, such as halogen, alkyl, alkoxy, aralkyl, or alicyclic substituents, etc., which are non-reactive with the phosphorus oxyhalide under the reaction conditions employed, in which case correspondingly substituted triaryl phosphates will be obtained. Certain of such substituted triaryl phosphates are described in the foregoing examples and tables. Other substituted triaryl phosphates may be prepared by reacting a phosphorus oxyhalide successively with:— (1) ortho-ethylphenol and para-tertiarybutylphenol to form either ortho-ethylphenyl-di-(para-tertiarybutylphenyl) phosphate or di-(ortho-ethylphenyl)-(para-tertiarybutylphenyl) phosphate; (2) 2,4,6-trichlorophenol and para-tertiarybutylphenyl phosphate to form 2,4,6-trichlorophenyl-di-(para-tertiarybutylphenyl) phosphate, etc.

The reactions involved in preparing a triaryl phosphate of the present class are sometimes sluggish, even when carried out in the presence of a catalyst. In such case, the rate of reaction and yield of product can be increased by carrying the reaction out under vacuum so as to remove hydrogen halide more effectively from the reaction mixture as it is formed.

Other modes of applying the principle of my invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:—

1. In a method of making a triaryl phosphate having the general formula

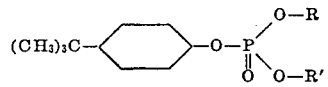

wherein R and R' represent aromatic radicals which may contain substituents that are substantially non-reactive toward a phosphorus oxyhalide, the step which consists in reacting an aryl phosphoric acid halide with para-tertiarybutylphenol at a temperature not exceeding 200° C.

2. In a method of making a triaryl phosphate having the general formula

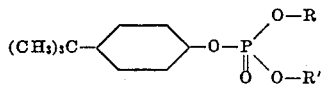

wherein R and R' represent aromatic radicals which may contain substituents that are substantially non-reactive toward a phosphorus oxyhalide, the steps which consist in heating a phosphorus oxyhalide to a reaction temperature not exceeding 200° C. with a phenolic compound to form a corresponding aryl phosphoric acid halide and thereafter heating the latter to a reaction temperature not exceeding 200° C. with at least one other phenolic compound to form a triaryl phosphate, at least one of said phenolic compounds being of the class consisting of para-tertiarybutylphenol and alkali metal salts thereof.

3. In a method of making a mixed triaryl phosphate having the general formula

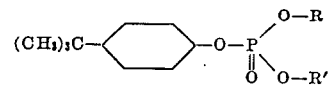

wherein R and R' represent aromatic radicals which may bear substituents that are substantially non-reactive toward phosphorus oxychloride and wherein at least one of said radicals R and R' is not the para-tertiarybutylphenol radical, the steps which consist in heating phosphorus oxychloride to a reaction temperature not exceeding 200° C. with not more than twice its molecular equivalent of a phenolic compound selected from the class consisting of para-tertiarybutylphenol and alkali metal salts thereof to form a para-tertiarybutylphenyl phosphoric acid chloride and heating the latter to a reaction temperature not exceeding 200° C. with sufficient other phenolic compound to form a mixed triaryl phosphate.

4. In a method of making tri-(para-tertiarybutylphenyl) phosphate, the step which consists in heating phosphorus oxychloride to a reaction temperature not exceeding 200° C. with about three times its molecular equivalent of para-tertiarybutylphenol.

5. In a method of making phenyl-di-(para-tertiarybutylphenyl) phosphate, the step which consists in heating phenyl phosphoric acid dichloride to a reaction temperature not exceeding 200° C. with approximately twice its molecular equivalent of para-tertiarybutylphenol.

6. In a method of making bis-phenyl-(para-tertiarybutylphenyl) phosphate, the step which consists in heating bis-phenyl phosphoric acid monochloride to a reaction temperature not exceeding 200° C. with approximately its molecular equivalent of para-tertiarybutylphenol.

7. A triaryl phosphate having the general formula

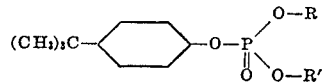

wherein R and R' represent aromatic radicals which may contain substituents that are substantially non-reactive toward a phosphorus oxyhalide.

8. Phenyl-di-(para-tertiarybutylphenyl) phosphate, a viscous liquid boiling at approximately 281° C. at 6 millimeters pressure, having the specific gravity 1.108 at 25° C. with respect to water at 4° C., and having the formula

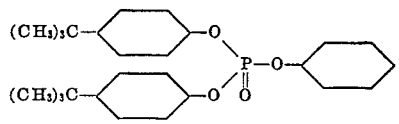

9. Bis-phenyl-(para-tertiarybutylphenyl) phosphate, a viscous liquid boiling at approximately 261° C. at 6 millimeters pressure, having the specific gravity 1.157 at 25° C. with respect to water at 4° C., and having the formula
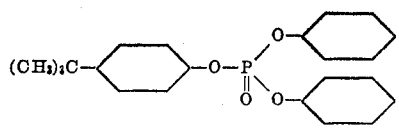
10. Para-tertiarybutylphenyl-di-(ortho-cresyl) phosphate, a viscous liquid boiling at approximately 284° C. at 20 millimeters pressure, having the specific gravity 1.137 at 25° C. with respect to water at the same temperature, and having the formula
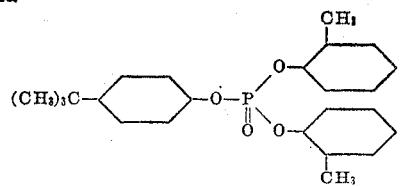
SHAILER L. BASS.